US009131326B2

(12) United States Patent
Gaalaas

(10) Patent No.: US 9,131,326 B2
(45) Date of Patent: Sep. 8, 2015

(54) AUDIO SIGNAL PROCESSING

(75) Inventor: Joseph B. Gaalaas, Boston, MA (US)

(73) Assignee: Bose Corporation, Framingham, MA (US)

(*) Notice: Subject to any disclaimer, the term of this patent is extended or adjusted under 35 U.S.C. 154(b) by 621 days.

(21) Appl. No.: 12/912,186

(22) Filed: Oct. 26, 2010

(65) Prior Publication Data

US 2012/0101605 A1 Apr. 26, 2012

(51) Int. Cl.
*G06F 17/00* (2006.01)
*H04S 3/00* (2006.01)
*H04S 7/00* (2006.01)

(52) U.S. Cl.
CPC .. *H04S 3/008* (2013.01); *H04S 7/30* (2013.01)

(58) Field of Classification Search
USPC .................... 700/94; 369/1-12; 704/500-504
See application file for complete search history.

(56) References Cited

U.S. PATENT DOCUMENTS

| | | | | |
|---|---|---|---|---|
| 5,987,417 | A * | 11/1999 | Heo et al. | 704/500 |
| 7,415,120 | B1 | 8/2008 | Vaudrey et al. | |
| 2006/0235553 | A1* | 10/2006 | Teramachi et al. | 700/94 |
| 2006/0251197 | A1 | 11/2006 | Zaucha et al. | |

FOREIGN PATENT DOCUMENTS

WO 2010132397 A1 11/2010

OTHER PUBLICATIONS

Information technology—Generic coding of moving pictures and associated audio information: Systems; ISO/IEC 13818-1 Second Edition; Dec. 1, 2000.*

Principles of Digital Audio, Fourth Edition by Ken C. Pohlmann; Copyright 2000.*

International Search Report and Written Opinion dated Jan. 20, 2012 for International Application No. PCT/US2011/057631.

* cited by examiner

*Primary Examiner* — Andrew C Flanders

(74) *Attorney, Agent, or Firm* — Brian M. Dingman; Dingman, McInnes & McLane, LLP

(57) ABSTRACT

A method and apparatus for determining if there is a stream of video signals corresponding with a stream of audio signals. If the sample rate of a digital bitstream including is determined. if the sample rate is 48 m kHz (where m is an integer), it is determined that there are video signals corresponding to the audio signals. If the sample rate is 44.1 m kHz (where m is an integer), it is determined that there are no video signals corresponding to the audio signals.

19 Claims, 4 Drawing Sheets

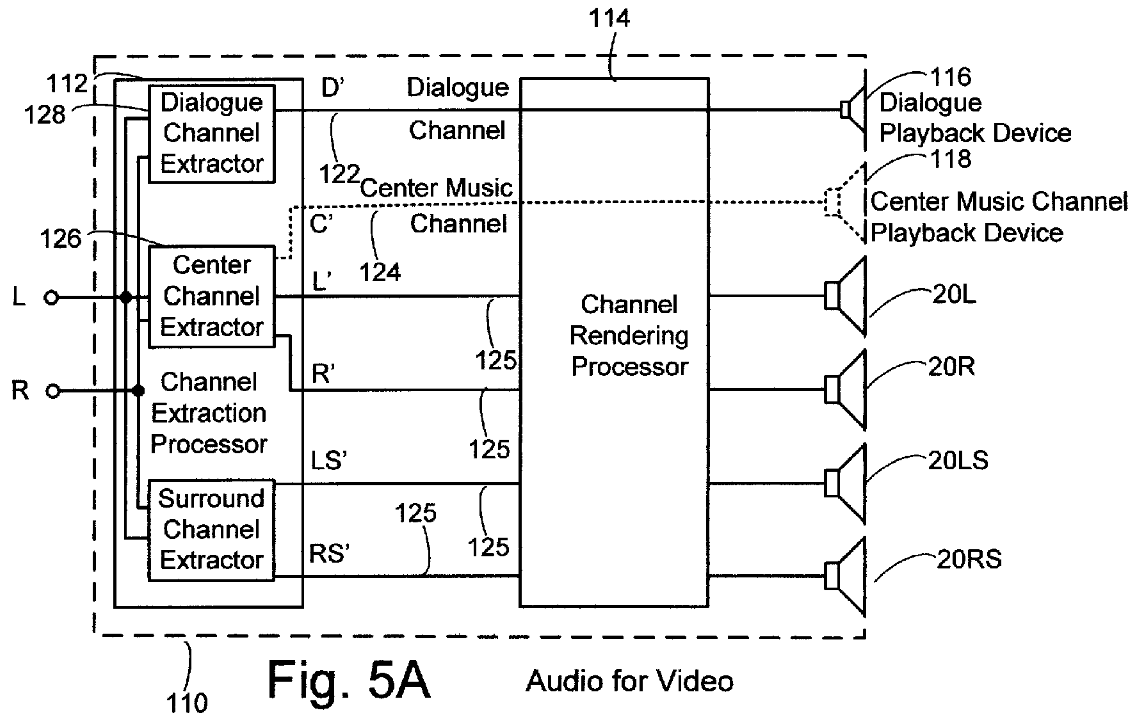
Fig. 5A Audio for Video
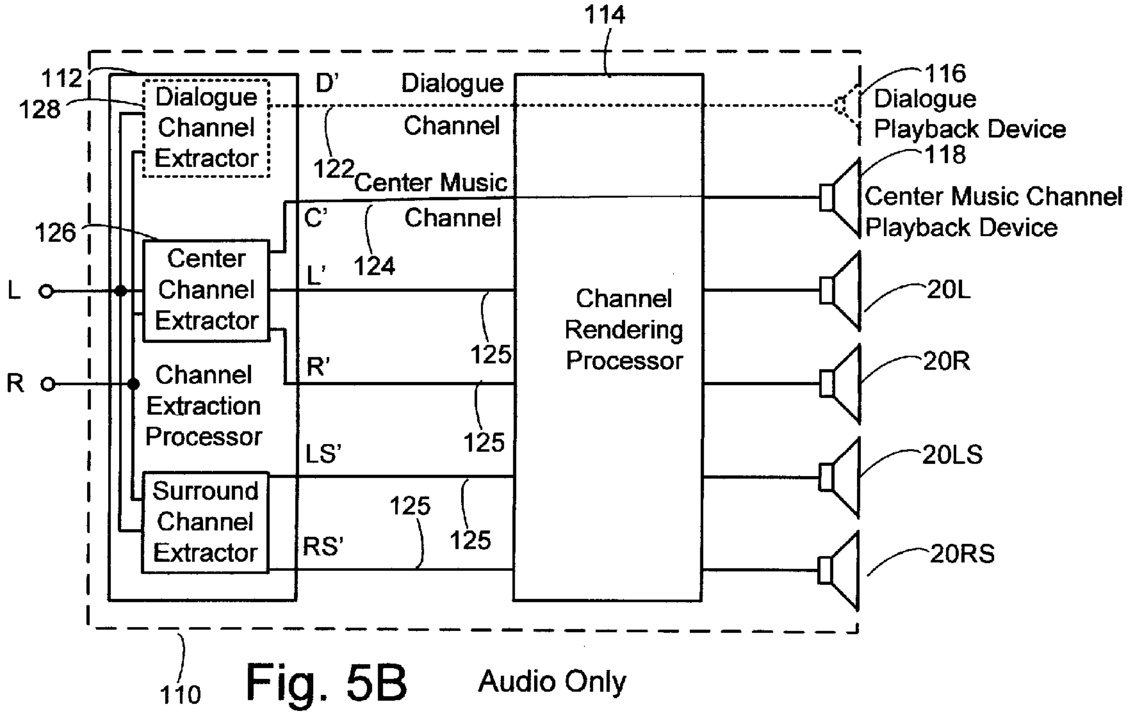
Fig. 5B Audio Only

AUDIO SIGNAL PROCESSING

BACKGROUND

This specification describes method and apparatus for determining if there is a stream of video signals corresponding to a stream of audio signals.

SUMMARY

In one aspect of the specification, a method includes determining the sample rate of a digital bitstream including audio signals. If the sample rate is 48 m kHz (where m is an integer), determining that there are video signals corresponding to the audio signals (hereinafter audio for video audio signals), and if the sample rate is 44.1 m kHz (where m is an integer), determining that there are no video signals corresponding to the audio signals (hereinafter audio only audio signals). The method may further include processing the audio for video audio signals differently than the audio only audio signals. The processing differently may include processing audio for video audio signals from n1 (where n1 is an integer) input channels to n2 (where n2 is an integer) output channels differently than processing audio only audio signals from n1 input channels to n2 output channels. The processing differently may include extracting a dialogue channel from the audio for video audio signals. The method may further include extracting a music center channel, distinct from the dialogue center channel. The method may further include radiating the music channel in a different radiation pattern than the dialogue center channel. In the method, n1 may be <n2. In the method n1 may be 2 and n2 may be 6, and the n2 output channels may include a music center channel and a dialogue center channel. In the method m may be 2 or 4.

In another aspect of the specification, an audio system includes apparatus for determining whether digitally encoded audio signals are audio for video audio signals or audio only audio signals. The apparatus includes circuitry for determining the sample rate of the digital bitstream, circuitry for determining, if the sample rate is 48 m kHz (where m is an integer), that the audio signals are audio for video, and circuitry for determining, if the sample rate is 44.1 m kHz (where m is an integer), that the audio signals are audio only. The audio system may further include circuitry for processing the audio for video audio signals differently than the audio only audio signals. The circuitry for processing differently may include circuitry for processing audio for video audio signals from n1 (where n1 is an integer) input channels to n2 (where n2 is an integer) output channels differently than processing audio only audio signals from n1 input channels to n2 output channels. The circuitry for processing differently may include circuitry for extracting a dialogue channel from the audio for video audio signals. The audio system may further includes circuitry for extracting a music center channel, distinct from the dialogue center channel. The audio system may further include loudspeakers for radiating the music channel in a different radiation pattern than the dialogue center channel. The loudspeakers may include directional arrays. In the audio system n1 may be <n2. In the audio system, n1 may be 2 n2 may be 6, and the n2 output channels may include a music center channel and a dialogue center channel. In the audio system of claim m may be 2 or 4.

Other features, objects, and advantages will become apparent from the following detailed description, when read in connection with the following drawing, in which:

BRIEF DESCRIPTION OF THE SEVERAL VIEWS OF THE DRAWING

FIGS. 5A and 5B are block diagrams of alternate configurations for processing audio signals.

DETAILED DESCRIPTION

Figure 1:
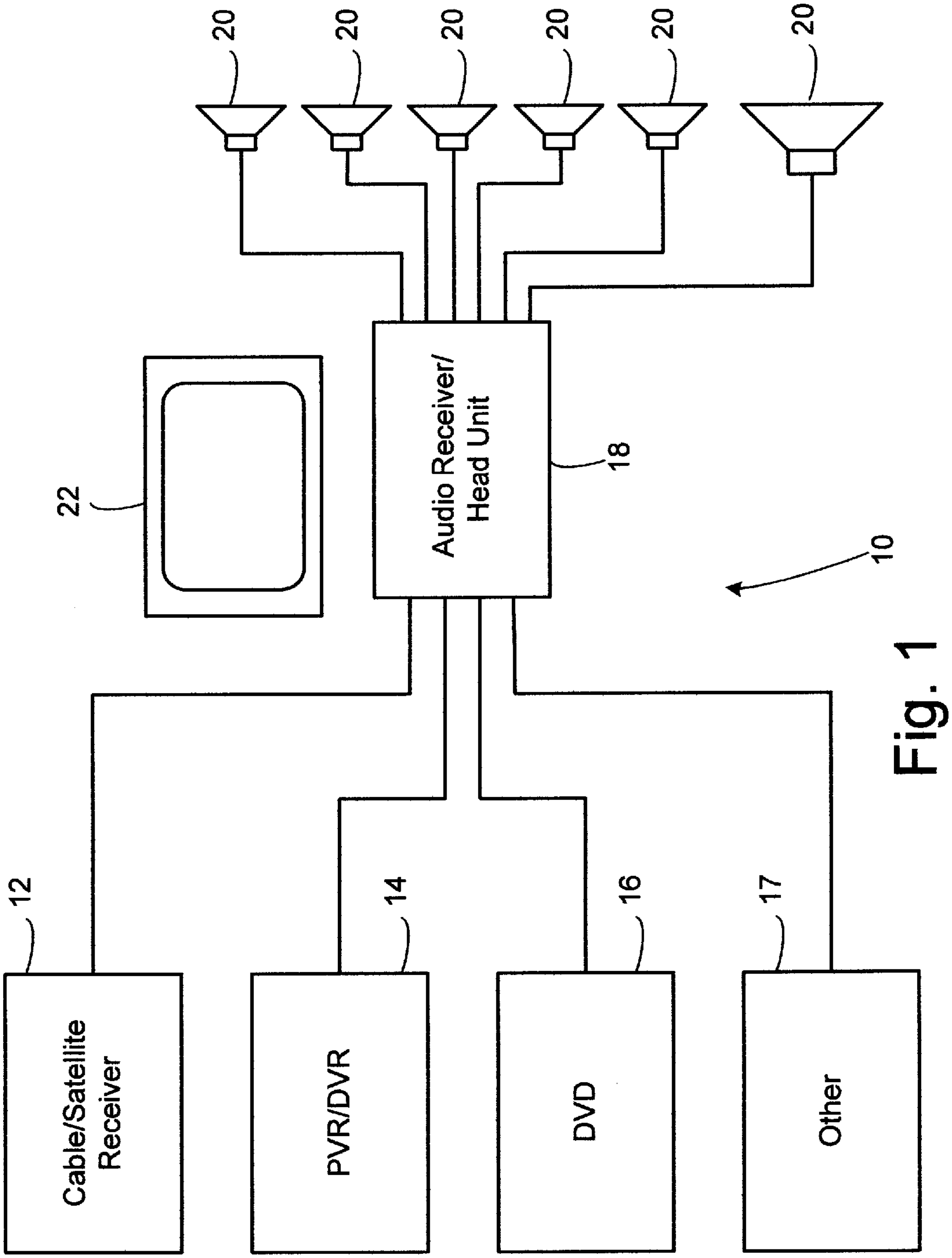
FIG. 1 is a block diagram of a home entertainment system.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. One element may perform the activities of more than one block. Unless otherwise indicated, audio signals or video signals or both may be encoded and transmitted in either digital or analog form; conventional digital-to-analog or analog-to-digital converters and amplifiers may be omitted from the figures.

FIG. 1 is a block diagram of some elements of a home entertainment system 10. A plurality, in this example four, of audio signal sources are operatively coupled to an audio receiver/head unit (hereinafter head unit) 18. The audio signal sources may include a cable/satellite receiver 12, a personal video recorder (PVR) or digital video recorder (DVR) 14, a DVD player 16, and another device 17, for example a personal music storage device. The head unit 18 is coupled with reproduction devices 20 (typically loudspeakers or headphones). The home entertainment system may also include a television 22 (interconnections to the television 22 are not shown in this view). The television 22 may receive video signals for which there are corresponding audio signals.

The audio signal sources may be coupled to the head unit 18 by terminals on the head unit. The terminals may be designated as terminals for receiving audio signals from a type of device. For example, the terminals may be designated "Cable/Satellite Receiver", "PVR/DVR", "DVD", and "Other" or "Aux". Alternatively, or in addition, the terminals may be designed to receive digital audio signals encoded in a particular format or transmitted through a particular type of connector and a terminal descriptor might indicate the signal format or type of connector. For example, the terminals might be HDMI (High Definition Multimedia Interface), SPDIF (Sony/Phillips Digital Interface Format) or USB (Universal Serial Bus) type terminals, which may be identified either by an indicator or by a distinctive physical appearance. There may be more than one of some of these types of terminals. For example, there may be more than one HDMI terminal. In another implementation, the there may be a wireless receiver in the head unit to receive the audio signals from the audio signal sources wirelessly.

In operation, the head unit 18 receives audio signals from the audio signal sources, processes the audio signals, and presents processed audio signal to the loudspeakers 20, which transduce the audio signals into sound waves. The head unit may process the audio signals from one source differently than audio signals from another source. Additionally, the head unit may process audio signals differently based on whether there are video signals (intended for reproduction by the television 22) corresponding with the audio signals, than if there are no video signals corresponding with the audio signals. Hereinafter, if there are video signals corresponding to the audio signals, the audio signals will be referred to as “audio for video” audio signals. If there are no video signals corresponding the audio signals, the audio signals will be referred to as “audio only” audio signals.

Figure 2:
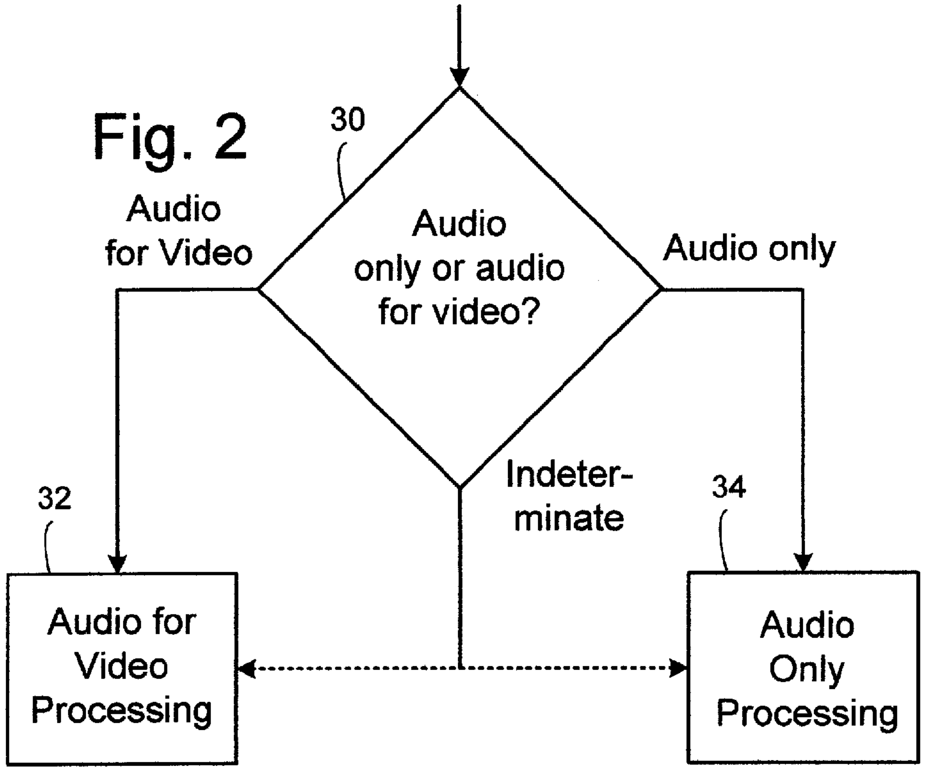
FIG. 2 is a block diagram of a process for operating a home entertainment system.

A process for processing audio for video audio signals differently than audio only audio signals is illustrated in FIG. 2. At block 30, it is determined if the audio signals are audio for video audio signals or audio only audio signals. If it is determined if the audio signals are audio for video, at block 32 signal processing appropriate for audio for video audio signals is applied. If it is determined that the audio signals audio only, at block 34 processing appropriate for audio only audio signals is applied. If it is indeterminate whether the audio signals are audio for video or audio only, the audio signals may be processed using either audio for video or audio only as a default. Additionally, other factors, such as described below may be used to override or supplement the process of FIG. 2.

In block 30 of FIG. 2, the audio system uses some method or device for determining if audio signals are audio for video or audio only. One method or device is to make an assumption based on the type of device. For example, if audio signals are received through a terminal that is designated “DVR/PVR”, it may be assumed that the audio signals are audio for video audio signals. However, for some types of devices, the assumption may not be accurate. For example, if a terminal is designated “DVD”, assuming that the audio signals area audio for video audio signals may be inaccurate in the common case in which a DVD player is used to play an CD containing audio only audio signals. Also, if the terminal is designated by format or type of terminal, an assumption that the audio signals are audio for video, or are audio only may be erroneous. For example, signals received by HDMI terminals or USB terminals may be either audio only or audio for video.

Another method for determining if audio signals are audio for video or are audio only is to read metadata that is typically included in digitally encoded signal streams. For example, if the metadata indicates that the audio signals are “matrix encoded”, it may be assumed that that the audio signals are audio for video. However, the metadata may not be present, or, if present, may not include information to indicate whether the audio signals are audio for video or audio only.

Another method for determining if audio signals are audio for video or are audio only is to encourage or require a designation from the user. This may be annoying to the user, or may result in the user incorrectly designating whether the audio signals are audio for video or audio only. Additionally, this method requires an additional element for the user interface, for example an additional button or an additional icon on a screen.

Figure 3:
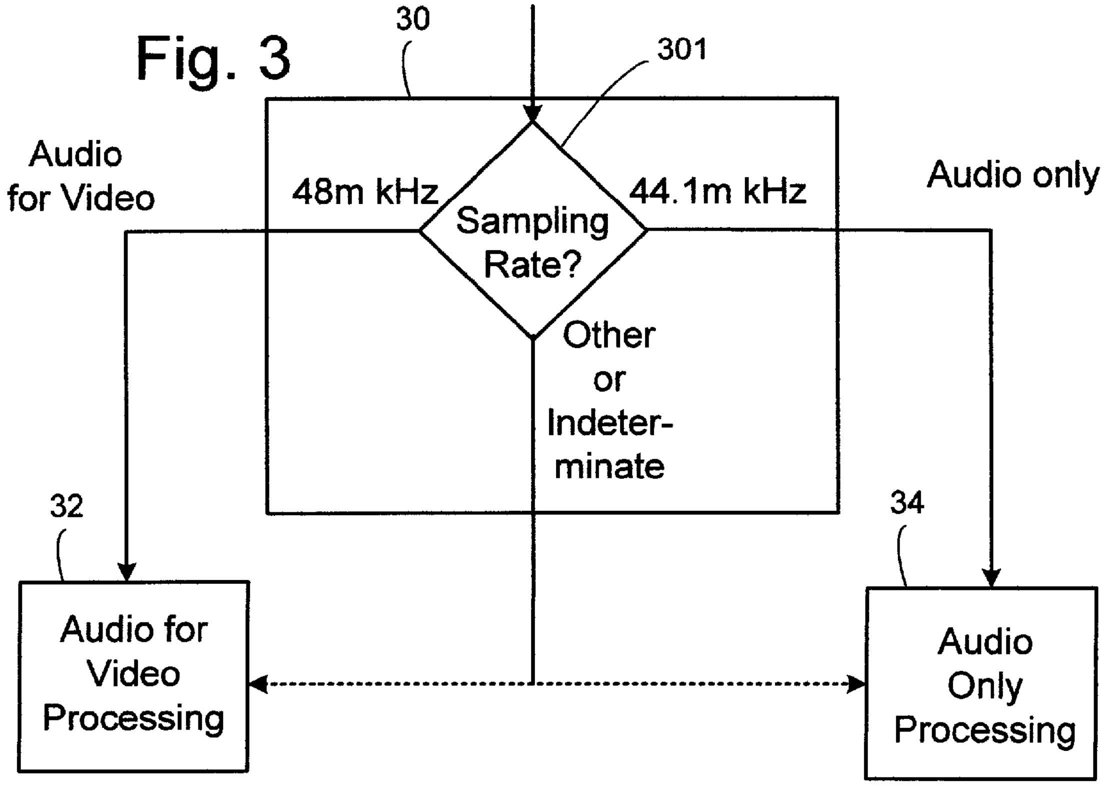
FIG. 3 is a block diagram of a process for operating a home entertainment system showing one of the blocks of FIG. 2 in more detail.

FIG. 3 shows the process of FIG. 2 with an implementation of block 30 shown in more detail. Block 30 of FIG. 3 includes block 301, in which the sampling rate of the input digital bitstream is determined. If the sampling rate of the input digital bitstream is 48 m kHz (where m is an integer, typically 1, 2, or 4), it is assumed that the audio signals are audio for video, and at block 32 processing for audio for video audio signals is applied. If the sampling rate of the input digital bitstream is 44.1 m kHz (where m is an integer, typically 1, 2, or 4), it is assumed that the audio signals are audio only, and at block 34, processing for audio only audio signals is applied. If the input of the digital bitstream is indeterminate or some value other than 44.1 kHz or 48 kHz, the audio only processing or the audio for video processing, or some other audio signal processing may be applied. Methods for determining the sample rate of a digital bitstream include reading metadata in the digital bitstream or measuring the number of samples in a known time interval.

In some instances, some or all of the data required for the process of FIG. 3 is already required to perform other operations, so the process of FIG. 3 requires no data in addition to the data that is already collected for other purposes. For example, it may be necessary to determine the sampling rate of the bitstream to apply an equalization pattern to the audio signals.

Figure 4:
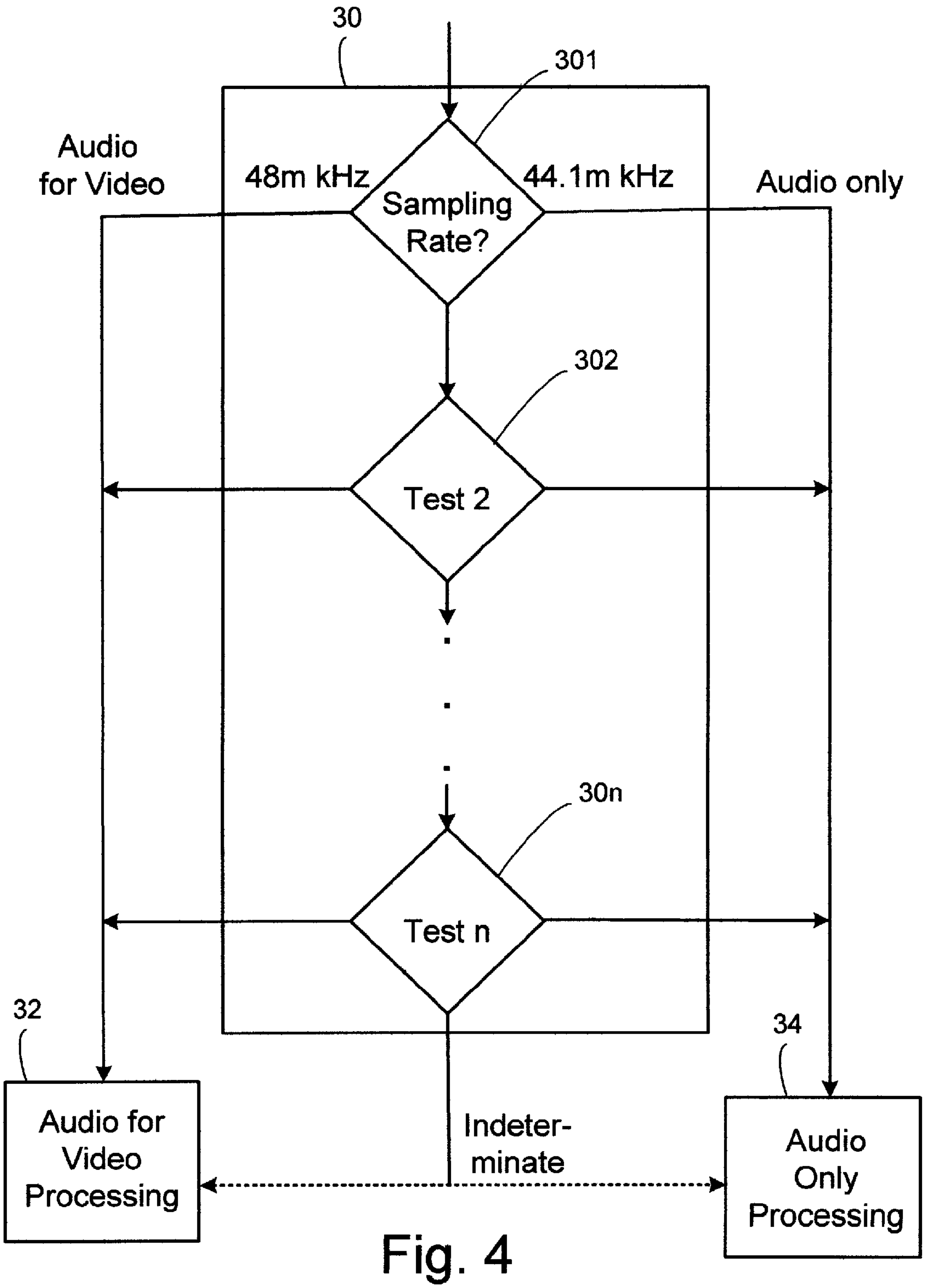
FIG. 4 is a block diagram of a process for operating a home entertainment system.

The process of block 301 of FIG. 3 may not be absolutely determinative of whether the audio signals are audio for video or audio only and may give an incorrect result in some cases (for example concert DVDs or cable or satellite music channels), but it is accurate in a large number of cases. To increase the accuracy of the estimation of the audio only or the audio for video nature of the audio signals, additional tests may be performed, represented in FIG. 4 by optional blocks 302 . . . **30*n***. The additional tests may include tests described previously, for example determining the type of device that is the source of the audio signals; reading the metadata of the digital bitstream; or other tests. Another test might be, for example, determining if the television is on or off. If the television is off, it may be assumed that the audio signals are audio only. If the television is on, it may be assumed that the audio signals are audio for video. The tests may be applied in the order shown, or some other order.

The determination of the sample rate and the processing of the audio signals is typically done by a microprocessor or digital signal processor (DSP). If other tests are applied (for example if the on/off state of the television is determined), other measurement devices, sensors, and connecting or wireless transmission circuitry may be included to perform the process of FIG. 4.

FIGS. 5A and 5B show an example of different processing that may be applied to audio for video audio signals and audio only audio signals. The audio system of FIGS. 5A and 5B decode two input channels L and R into more channels.

The audio processing systems 110 of FIGS. 5A and 5B each include input terminals L and R, coupled to channel extraction processor 112, which includes a dialogue channel extractor 128, a center music channel extractor 126, and a surround channel extractor. The elements of the channel extractor 112 are coupled to a channel rendering processor 114, which is coupled to dialogue playback device 116, center music channel playback device 118 and other playback devices 20L, 20R, 20LS, and 20RS. More information on the operation of FIGS. 5A and 5B can be found in U.S. patent application Ser. No. 12/465,146, “Center Channel Rendering”, filed May 13, 2009 by Berardi, et al. incorporated by reference in its entirety.

FIG. 5A shows a system configured for audio for video processing. The audio system includes input channels L and R. The audio system may include a channel extraction processor 112 and a channel rendering processor 114. The channel extractor 112 includes a dialogue extractor 128 that extracts a dialogue center channel from the L and R signals, according to U.S. patent application Ser. No. 12/465,146. The audio system further includes a number of playback devices, which may include a dialogue playback device 116, a center music channel playback device 118, and other playback devices 20.

In operation, the channel extraction processor 112 extracts, from the input channels L and R, additional channels that may be not be included in the input channels, as explained in U.S. patent application Ser. No. 12/465,146. The additional channels may include a dialogue channel 122, a center music channel 124, and other channels 125. The channel rendering processor 114 prepares the audio signals in the audio channels for reproduction by the dialogue playback device 116 and other playback devices 20L, 20R, 20LS and 20RS. Processing done by the rendering processor 114 may include amplification, equalization, and other audio signal processing, such as spatial enhancement processing.

The dialogue center channel may then by radiated by a dialogue playback device 116, which may have frequency and directionality characteristics suitable to provide a "tight" acoustic image in the speech frequency band that is unambiguously in the vicinity of the television screen. For example, the dialogue playback device may be a directional loudspeaker, for example an interference array, as described in U.S. patent application Ser. No. 12/465,146. The center music channel extractor 126 and the center channel music playback device 118, as indicated by the dotted lines, or the center music channel extractor 126 may extract a music center channel as described in U.S. patent application Ser. No. 12/465,146 and center music channel playback device 118 may radiate the music center channel so that the center music channel acoustic image is more diffuse than the acoustic image of the dialogue center channel.

The audio system of FIG. 5B shows a system configured for audio for video processing. The audio system of FIG. 5B includes the elements of FIG. 5A, except the dialogue channel extractor 128 and the dialogue playback device 116 are inactive, as indicated by the dotted lines.

In operation, the channel extraction processor 112 extracts, from the input channels L and R, additional channels that may be not be included in the input channels, as explained in U.S. patent application Ser. No. 12/465,146. The additional channels may include a center music channel 124, and other channels 125. The channel rendering processor 114 prepares the audio signals in the audio channels for reproduction by the center music channel playback device 116 and other playback devices 20. Processing done by the rendering processor 114 may include amplification, equalization, and other audio signal processing, such as spatial enhancement processing.

The center music channel may then by radiated by a center music channel playback device 118, which may have frequency and directionality characteristics suitable to provide a diffuse center acoustic image in a frequency range typical of music. For example, the dialogue playback device may be an omnidirectional loudspeaker. The dialogue channel extractor 128 and the dialogue playback device 116 may be inactive, as indicated by the dotted lines.

The systems of FIGS. 5A and 5B, in which a number n (in this example, two) of input channels are process are processed to provide >n output channels is called "upmixing". Another example of different processing applied by the head unit is "downmixing", in which n input channels are processed to provide <n output channels, or "remixing", in which n input channels are processed to provide n output channels with different content than the n input channels Another example of different processing applied by the head unit is dynamic range compression. If the input audio signals are audio for video signals, any compression that may be applied to the signals may be different than the compression that is applied to audio only audio signals. For example, different frequency ranges could be compressed differently.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A circuit-implemented method, comprising:

Determining, by a circuit, a video characteristic of a digital bitstream according to a sample rate of an audio signal in the digital bitstream wherein determining comprises:

if the sample rate of the audio signal is 48 m kHz, where m is an integer, determining that there are video signals corresponding to the audio signals; and if the sample rate of the audio signal is 44.1 m kHz, where m is an integer, determining that there are no video signals corresponding to the audio signals;

if the determining step is indeterminate of whether or not there are video signals corresponding to the audio signals, performing by the circuit one or more additional tests to determine whether or not there are video signals corresponding to the audio signals.

2. The circuit-implemented method of claim 1, further comprising:

processing the audio signal differently when the sample rate of the audio signal is 48 m kHz than when the sample rate of the audio signal is 44.1 m kHz.

3. The circuit-implemented method of claim 2, wherein the processing differently comprises processing the audio signal when the sample rate of the audio signal is 48 m kHz from n1, where n1 is an integer, input channels to n2, where n2 is an integer, output channels differently than processing the audio signal when the sample rate of the audio signal is 44.1 m kHz from n1 input channels to n2 output channels.

4. The circuit-implemented method of claim 3, wherein the processing differently comprises extracting a dialogue channel from the audio signal when the sample rate of the audio signal is 48 m kHz.

5. The circuit-implemented method of claim 4, further comprising extracting a music center channel, distinct from the dialogue center channel.

6. The circuit-implemented method of claim 5 further comprising radiating the music channel in a different radiation pattern than the dialogue center channel.

7. The circuit-implemented method of claim 3 wherein n1<n2.

8. The circuit-implemented method of claim 7 wherein n1=2 and n2=6, and wherein the n2 output channels comprise a music center channel and a dialogue center channel.

9. The circuit-implemented method of claim 1, wherein m is 2 or 4.

10. An audio system, comprising:

apparatus for determining a video characteristic of a digital bitstream according to a sample rate of an audio signal in the digital bitstream comprising:

circuitry for determining the sample rate of the digital bitstream;

circuitry for determining:

if the sample rate is 48 m kHz, where m is an integer, that the audio signals are audio for video;

if the sample rate is 44.1 m kHz, where m is an integer, that the audio signals are audio only; and circuitry for performing, if the determining is indeterminate of whether the audio signals are audio only or audio for video, one or more additional tests to determine whether the audio signals are audio only or audio for video.

11. The audio system of claim 10, further comprising: circuitry for processing the audio for video audio signals differently than the audio only audio signals.

12. The audio system of claim 11, wherein the circuitry for processing differently comprises circuitry for processing audio for video audio signals from n1 (where n1 is an integer) input channels to n2, where n2 is an integer, output channels differently than processing audio only audio signals from n1 input channels to n2 output channels.

13. The audio system of claim 12, wherein the circuitry for processing differently comprises circuitry for extracting a dialogue channel from the audio for video audio signals.

14. The audio system of claim 13, further comprising circuitry for extracting a music center channel, distinct from the dialogue center channel.

15. The audio system of claim 14, further comprising loudspeakers for radiating the music channel in a different radiation pattern than the dialogue center channel.

16. The audio system of claim 15, wherein the loudspeakers comprise directional arrays.

17. The audio system of claim 12 wherein $n1<n2$.

18. The audio system of claim 17 wherein $n1=2$ and $n2=6$, and wherein the n2 output channels comprise a music center channel and a dialogue center channel.

19. The audio system of claim 10, wherein m is 2 or 4.

* * * * *